United States Patent [19]

Conway

[11] Patent Number: 4,693,441

[45] Date of Patent: Sep. 15, 1987

[54] PAD HOLDER AND DISPLAY

[76] Inventor: Gerald A. Conway, 3133 Fairfax Rd., Cleveland Heights, Ohio 44118

[21] Appl. No.: 715,355

[22] Filed: Mar. 25, 1985

[51] Int. Cl.[4] ............................................ F16L 3/08

[52] U.S. Cl. ............................ 248/225.1; 248/221.4; 211/57.1; 206/526; 206/806; 206/813; 40/11 R; 40/16.4

[58] Field of Search .................... 211/57.1, 59.1, 54.1, 211/86, 45; 206/526, 813, 460, 806; 40/11 R, 10 R, 16.4, 16.2, 124.2, 124.4, 124, 308, 22, 312, 316, 23 A; 248/220.3, 220.4, 221.1, 221.2, 309.2, 205.3, 221.4, 224.1, 214, 215, 220.2, 225.1, 214, 205.1; 402/19

[56] References Cited

U.S. PATENT DOCUMENTS

| | | | |
|---|---|---|---|
| 1,980,948 | 11/1934 | Abramson | 248/214 X |
| 2,182,085 | 12/1939 | Kellner et al. | 248/214 X |
| 2,605,566 | 8/1952 | De Dell, Jr. | 40/316 X |
| 3,216,584 | 11/1965 | Sedo | 248/220.3 X |
| 4,016,977 | 4/1977 | Krautsack | 248/221.4 X |
| 4,113,109 | 9/1978 | Donnelli et al. | 206/806 X |
| 4,274,567 | 6/1981 | Sawyer | 40/10 R |
| 4,477,048 | 10/1984 | Conway | 248/447.1 |
| 4,572,380 | 2/1986 | Langwell | 211/57.1 |

*Primary Examiner*—Ramon S. Britts
*Assistant Examiner*—Blair M. Johnson
*Attorney, Agent, or Firm*—Renner, Otto, Boisselle & Lyon

[57] ABSTRACT

A point of purchase flexible pad holder and display includes a stiff plastic sheet having an upper clear section which may snap into a price channel, be hung on a peg, snapped onto a horizontal wire, locked into the top of the exposed corrugations of cut packing boxes, cases, or the like, and which may be used in toto or in part to position and secure tear-off pads or displays to essentially any surface. The sheet is formed with two symmetrical holes having intersecting slits and fold lines which enable improved versatility and stability in application.

18 Claims, 6 Drawing Figures

PAD HOLDER AND DISPLAY

DISCLOSURE

This invention relates generally as indicated to a point of purchase flexible pad holder and display, and more particularly to such holder and display which has a wide variety of uses and applications in point of purchase marketing while being nonetheless economical to manufacture.

BACKGROUND OF THE INVENTION

The present invention relates to a flexible pad holder and display which is an improvement over the invention disclosed and claimed in applicant's prior U.S. Pat. No. 4,477,048. The product marketed under such prior patent has met with substantial commercial success, being sold under the trademark VERSA CLIP by Fasteners For Retail of Cleveland, Ohio. The present invention represents an effort further to widen the application and versatility of such clip while maintaining all of the prior clip's advantages and cost of manufacture.

SUMMARY OF THE INVENTION

The present invention deals with a point of purchase flexible pad holder and display which includes a stiff plastic sheet having an upper clear section which may snap into a price channel, be hung on a peg, snapped onto a horizontal wire, locked into the top of exposed corrugations of cut packing boxes, cases, or the like, and which may be used in toto or in part to position and secure tear-off pads or displays to essentially any surface or displays commonly found in retail outlets.

The sheet is formed with two symmetrical smaller holes on each side of a somewhat larger hole, the smaller holes being provided with intersecting slits and fold lines. The slits extend inwardly and then downwardly at an angle with respect to the side edges of the clip to form with such side edges two relatively sharp pointed portions which may be displaced from the plane of the clip and driven into the tops of such cut packing cases and the like. The side edges of the clip defined by the fold lines, holes and slits may be bent from the plane of the clip permitting the clip readily to be fastened to a horizontally extending wire commonly found in wire baskets or displays thus enabling the clip to be hooked securely thereto. The lower edges of the slits terminate in relatively short horizontal sections which cooperate with the deflectable lower edge of a center panel so that the clip may readily be inserted with improved stability into a pricing channel.

The lower portion of the clip may be provided with adhesive panels on one or both sides to facilitate the connection thereto of tear-off pads. The lower portion of the clip may be removed utilizing the deflectable horizontal aligned edges as score points so that the double sided adhesive form of the invention may be adhered to substantially any planar surface with the opposite side being used to secure a tear-off pad.

To the accomplishment of the foregoing and related ends the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In said annexed drawing:

FIG. 6 is a similar perspective view illustrating the sides of the flexible pad holder and disply folded and hooked onto a horizontal wire component of a wire basket, bin, or the like.

DETAILED DESCRIPTION OF THE PREFERRED EMBODIMENTS

Figure 1:
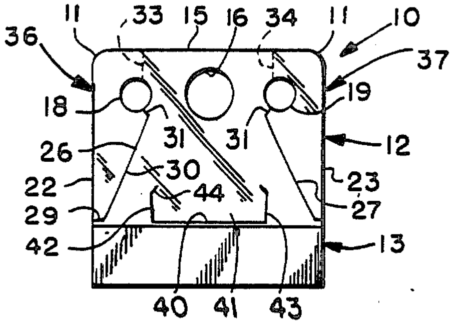
FIG. 1 is a plan view of a flexible pad holder and display in accordance with the present invention.
Figure 2:
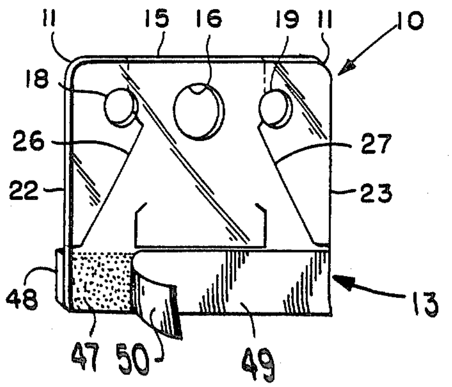
FIG. 2 is a perspective view of such flexible pad holder and display illustrating how the adhesive lower section on one or both sides may be exposed by tearing off the protective strip.

Referring first to FIGS. 1 and 2, it will be seen that the flexible pad holder and display of the present invention comprises a generally square sheet of flexible transparent plastic material shown generally at 10. The sheet may, for example, be Mylar. While the sheet is fairly rigid, it is nonetheless flexible from its plan of major extent. The sheet includes rounded corners 11 at the top and an upper section 12 and a lower section 13. The upper section is approximately two and one-half times the height of the lower section.

As indicated, the upper section may include a top straight horizontal edge 15 and a centered fairly large circular hole 16 spaced somewhat from the upper edge.

Spaced symmetrically on each side of the center hole 16 are somewhat smaller holes 18 and 19 with the centers of all such holes being horizontally aligned. The holes 18 and 19 are spaced inwardly from the vertical edges 22 and 23 of the clip as well as downwardly from the horizontal top edge 15.

Communicating with the holes 18 and 19 are slits shown generally at 26 and 27, each of which extends inwardly from the vertical edge at the lower portion of the upper section in a short horizontal section as seen at 29, and then upwardly at a sharply inclined angle seen at 30 extending beyond or inwardly of a vertical diameter of the hole, and then, at a reverse angle, extending backwardly into the hole as seen at 31. The intersection of the slit with the hole is inwardly of such vertical diameter.

Extending from the holes 18 and 19 vertically upwardly are two fold lines seen at 33 and 34, which again may be positioned somewhat inwardly of the vertical diameter through such holes. Such fold lines may preferably take the form of a slight depression in the strip from the rear thereof or, for example, may take the form of score lines. The former is preferred. In any event the fold lines, holes and slits form wings shown generally at 36 and 37 which may be folded to lie in a plane at an angle to or essentially normal to the major plane of the clip. The positioning of the slits and fold lines inwardly of the vertical diameter of such holes leaves the major portion of such circular holes within the foldable wings. Also, it will be appreciated that the point indicated at 37 of the slit, when such wings are folded, will project forwardly of the front plane of the clip.

The lower end of the slits as they intersect the lateral or side edges of the clip through the relatively short horizontal sections 29 form relatively sharp points which may be deflected from the general plane of the clip. Such horizontal short sections 29 are also aligned with the lower horizontal edge 40 of a central die cut panel 42 which includes not only the lower horizontal edge 40 but also vertical slits shown generally at 42 and 43 which upwardly terminate in short inwardly inclined sections 44. It is noted that the relatively short horizontal section of the major inclined extent of the slits 26 and 27 are horizontally aligned with the lower edge 40 of the central panel 41. In this manner, the lower section of the clip may be folded along such horizontal alignment and readily torn from the remainder of the clip. Thus such horizontally aligned edges form, in effect, score lines permitting ready removal of the lower portion of the clip.

The lower portion of the clip may include adhesive indicated generally at 47 on one or both sides of such lower portion, such adhesive being covered by removable strips seen at 48 and 49. The adhesive may be exposed simply by peeling off the covering strip as indicated by the curled edge 50 of such strip 49. In this manner a flexible pad holder shown generally at 52 may readily be secured to the front face of the lower part of the clip. When the lower section is removed, the back section of the clip may be adhesively secured to substantially any vertical wall or surface such that a tear-off pad may be mounted at any position thereon.

Figure 3:
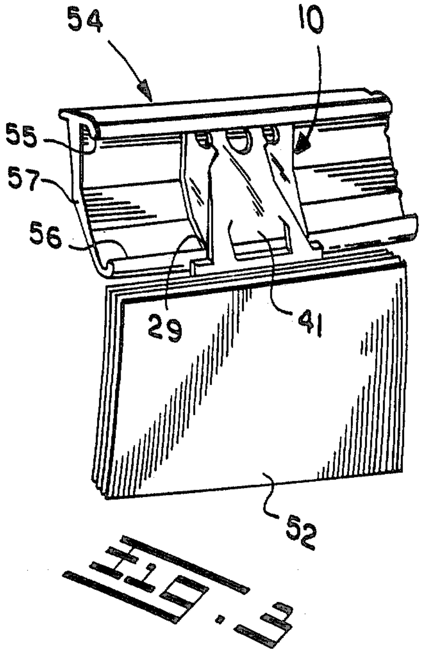
FIG. 3 is a fragmentary perspective view illustrating the flexible pad holder and display supporting a tear-off pad and in turn being secured within a common pricing channel.

Referring now to FIG. 3, there is illustrated the clip of the present invention mounted in a common gondola or price channel shown generally at 54. As indicated, the price channel comprises an upper downturned front lip 55 and a lower upturned lip 56 with a slightly inwardly bowed section 57 therebetween.

The clip of the present invention may readily be mounted in such price channel by inserting the upper edge 15 of the clip in the upper portion of the channel and deflecting the wings and central panel rearwardly so that the short horizontal sections 29 and and the lower horizontal edge 40 of the central panel fit into and behind the lower flange 56. In this manner the clip is snapped into or secured in the price channel and is provided with a bearing surface along the entire upper edge 15 of the clip and two bearing surfaces 29 at each lower edge of the clip as well as the bearing surface of the major horizontal edge 40 of the central panel 41. The positioning of the bearing edges inside the upper and lower edges of the channel resist torsional movement to prevent the clip from being dislodged when a sheet is torn or removed from the pad 52.

Figure 4:
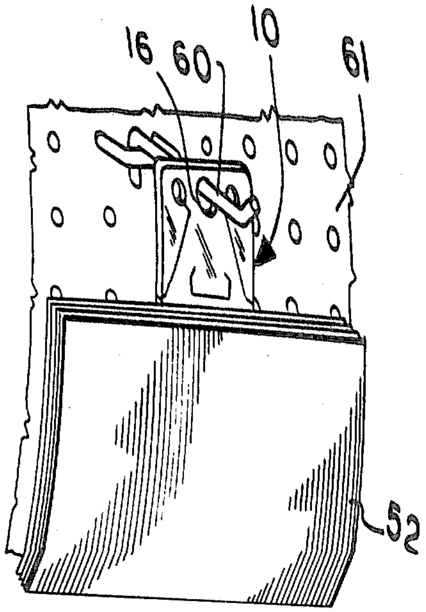
FIG. 4 is an illustration similar to FIG. 3 showing the flexible pad holder mounted on a peg.

As seen in FIG. 4, the clip may readily be mounted on a peg 60 projecting from pegboard 61 simply by placing the clip with the tear-off pad 52 in place. A peg readily fits through the central hole 16.

Figure 5:
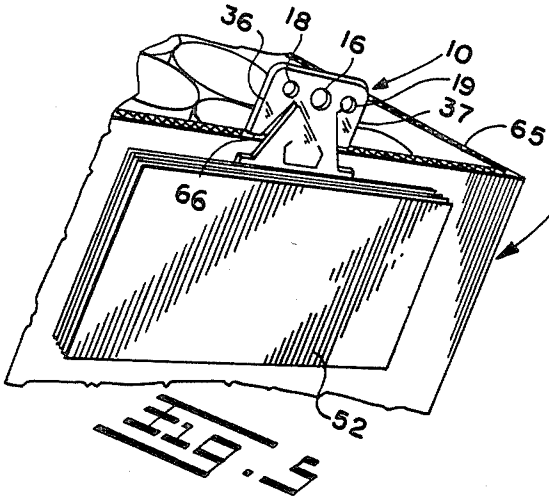
FIG. 5 is a view similar to FIGS. 3 and 4 illustrating the flexible pad holder and display mounted on the top edge of a cut case.

As seen more clearly in FIG. 5, the pad 52 may be mounted on the top of a cut case or box 64. As indicated typically at 65, the cut edge of the box exposes corrugated cardboard which may comprise corrugations between two spaced faces.

The lower ends of the wings 36 and 37 which provide relatively sharp downwardly extending points, reduced in sharpness only by the horizontal edges 29, may be driven into such corrugations as indicated at 66 firmly to support the clip and thus the tear-off pad on the top edge of such cut-off case. The downwardly projecting slightly pointed ends of the wings may only be deflected slightly rearwardly of the normal plane of the clip upper portion and then driven vertically into the exposed corrugated cardboard. In this manner the clip may readily support the tear-off pad at any desired position along the cut edge of the case or like material.

Figure 6:
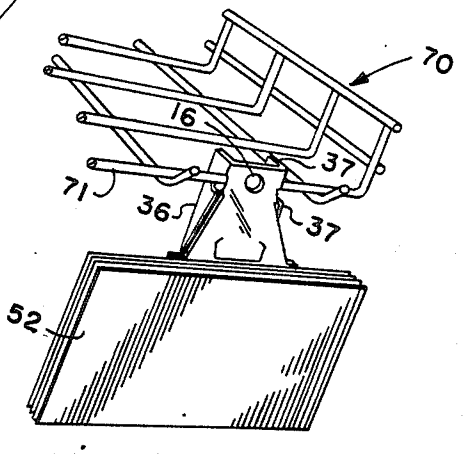

Referring now to FIG. 6, there is illustrated a wire basket shown generally at 70 which may include a horizontally extending wire 71. By folding the wings 36 and 37 inwardly and parallel to each other, utilizing both the slits and the fold lines 33 and 34, access to the holes 18 and 19 may be provided through such slits so that the clip may be hooked on the wire 71 with such wire running immediately behind the plane of the clip. Because of the positioning of the fold lines 33 and 34, the majority of the top surface of the hole overlies the wire, and also the majority of the bottom surface of the hole underlies such wire, thus preventing the clip from inadvertently being disengaged from the wire as an itemm from the tear-off pad is removed. It will also be noted that the projection 31 formed by the angularly related portions of the slit project somewhat forwardly of the front face of the clip, in effect locking the clip on the horizontal wire extending therebehind. Thus not only does the slit provide access to the holes 18 and 19 for the wire to pass therethrough, but the configuration of the wings as folded secures such clip to such wire such that removal of one of the items on the tear-off pad cannot normally inadvertently remove the clip from the supporting wire.

It will be appreciated that a wide variety of wire basket, bins or even grocery carts are employed in point of purchase retailing to which the clip of the present invention may readily be secured in the fashion indicated.

In any event it will be appreciated that applicant's present invention greatly improves the versatility and application of the prior invention while maintaining the cost and advantages of such prior invention.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

I claim:

1. A display clip comprising a flexible but stiff sheet having a circular hole therein, a slit in said sheet leading from a side edge of said sheet and extending upwardly to said hole at an angle to said side edge and inwardly from said side edge to a point beyond a vertical line through the center of the hole and then back to join the lower edge of the hole inwardly of such vertical line whereby upon flexing of said sheet said slit may be opened to provide access to the hole, and means for defining a fold line extending upwardly from said hole to an edge of said sheet whereby a portion of said sheet defined by said slit, hole and fold line may be bent along said fold line to a plane extending at an angle to the plane of the sheet to form a downwardly opening hook extending at such angle to the plane of the sheet, said fold line and slit intersecting said hole such that said portion of said sheet defines a part of the hole which has a lower edge extending upwardly to the point of intersection of said slit with said hole when said portion of said sheet is bent along said fold line, whereby said clip may be hung on wires, rods or the like.

2. A clip as set forth in claim 1 wherein the side edge and slit form a relatively sharp point at their intersection so that such point may be deflected from the plane of the clip and driven into the top edge of cut cases and the like to support the clip therefrom.

3. A clip as set forth in claim 1 wherein said fold line extends vertically from said hole inwardly of such vertical line through the center of said hole.

4. A clip as set forth in claim 1 wherein said fold line and slit intersect said hole so that the majority of the edge of the hole is defined by the bent plane.

5. A clip as set forth in claim 1 including symmetrically disposed holes and slits, said slits terminating in short horizontal sections at each edge which may be deflected from the plane of the clip to engage the lower edge of a pricing channel.

6. A clip as set fort in claim 5 including a center of deflectable panel having a lower horizontal edge horizontally aligned with said short horizontal sections whereby the clip may be supported in a pricing channel by engaging the upper edge of the clip on the upper edge of the channel and deflecting the short horizontal sections at each edge and the lower horizontal edge of the center panel each to engage the lower edge of the pricing channel.

7. A clip as set forth in claim 6 including a lower adhesive section whereby a tear-off pad may be secured to said clip.

8. A clip as set forth in claim 11 wherein said lower adhesive section may be removed from said clip utilizing sais short horizontal sections at each edge and said lower horizontal edge of the center panel as score lines.

9. A clip as set forth in claim 5 including a hole in the center of the clip whereby the clip may be hung from a peg.

10. A display clip comprising a flexible but stiff sheet, a slit in said sheet extending downwardly to define one side edge of a portion of said sheet, said portion of said sheet having a downwardly extending opposite side edge, said slit and opposite side edge progressively coming closer together going from top to bottom to form at intersecting lower ends thereof a relatively sharp point which may be deflected from the plane of the clip and driven into the top edge of cut cases and the like to support the clip therefrom said clip further comprising a circular hole therein, said slit in said sheet leading from said opposite side edge of said sheet and extending upwardly to said hole at an angle to said side edge and inwardly from said side edge to a point beyond a vertical line through the center of the hole and then back to join the lower edge of the hole inwardly of such vertical line whereby upon flexing of said sheet said slit may be opened to provide access to the hole, and means for defining a fold line extending upwardly from said hole to an edge of said sheet whereby a portion of said sheet defined by said slit, hole and fold line may be bent along said fold line to a plane extending at an angel to the plane of the sheet to form a downwardly opening hook extending at such angle to the plane of the sheet, said fold line and slit intersecting said hole such that said portion of said sheet defines a part of the hole which has a lower edge extending upwardly to point of intersection of said slit with said hole when said portion of said sheet is bent along said fold line, whereby said clip may be hung on wires, rods or the like.

11. A clip as set forth in claim 10 including two slits symmetrically extending at an angle to each side edge of the clip, said relatively sharp points being formed at the intersections of such slits and edges.

12. A clip as set forth in claim 11 wherein said slits terminate in short horizontal sections at each edge.

13. A clip as set forth in claim 12 including a center defectable panel having a lower horizontal edge horizontally aligned with said short horizontal sections whereby the clip may be supported in a pricing channel by engaging the upper edge of the clip in the upper edge of the channel and deflecting the short horizontal sections at each edge and the lower horizontal edge of the center panel each to engage the lower edge of the pricing channel.

14. A clip as set forth in claim 13 including a lower adhesive section whereby a tear-off pad may be secured to said clip.

15. A clip as set forth in claim 14 wherein said lower adhesive section may be removed from said clip utilizing said short horizontal sections at each edge and said lower horizontal edge of the center panel as score lines.

16. A clip as set forth in claim 12 including a hole in the center of the clip whereby the clip may be hung from a peg.

17. A clip as set forth in claim 10 wherein said sheet has an upper section including said slit and a lower section, said upper section including a downwardly projecting center panel having a horizontal lower edge and downwardly extending lateral portions at respective sides of said center panel pendently supporting the lower section from the upper section, whereby the clip may be supported in a pricing channel by engaging an upper edge of the clip in the upper edge of the channel and deflecting the center panel to engage the lower edge thereof in the lower edge of the pricing channel with said lateral portions cooperating to resist torsional twisting of the lower section as when a sheet is torn from a pad secured to the lower section.

18. A display clip comprising a flexible but stiff sheet having a hole therein, means for defining a fold line extending upwardly from said hole, a slit extending downwardly from said hole to define with said hole and fold line one side edge of a portion of said sheet, said portion of said sheet having an opposite side edge and a top edge terminating at the upper end of said fold line so that said portion of said sheet may be bent rearwardly along said fold line to a plane extending at an angle to the plane of said sheet to form a downwardly opening hook extending at such angle to the plane of said sheet, and said slit and fold line intersecting said hole such that the point at which the slit intersects the hole will be located forwardly of the plane of said sheet when said portion of said sheet is bent rearwardly along said fold line whereby inadvertent disengagement of the clip from a wire, rod or the like is prevented when hung by said hook from such wire, rod or the like.

* * * * *